US008585538B2

(12) United States Patent
Sheridan et al.

(10) Patent No.: US 8,585,538 B2
(45) Date of Patent: Nov. 19, 2013

(54) COUPLING SYSTEM FOR A STAR GEAR TRAIN IN A GAS TURBINE ENGINE

(75) Inventors: William G. Sheridan, Southington, CT (US); Michael E. McClune, Colchester, CT (US); Alessio Pescosolido, West Hartford, CT (US)

(73) Assignee: United Technologies Corporation, Hartford, CT (US)

( * ) Notice: Subject to any disclaimer, the term of this patent is extended or adjusted under 35 U.S.C. 154(b) by 971 days.

(21) Appl. No.: 12/644,848

(22) Filed: Dec. 22, 2009

(65) Prior Publication Data

US 2010/0105516 A1   Apr. 29, 2010

Related U.S. Application Data

(63) Continuation-in-part of application No. 11/481,112, filed on Jul. 5, 2006, now Pat. No. 7,704,178.

(51) Int. Cl.
*F16H 57/08* (2006.01)

(52) U.S. Cl.
USPC .......................................... 475/346; 475/347

(58) Field of Classification Search
USPC .................................. 475/346, 347
See application file for complete search history.

(56) References Cited

U.S. PATENT DOCUMENTS

| 3,754,484 | A | 8/1973 | Roberts |
| 4,084,861 | A | 4/1978 | Greenberg et al. |
| 4,265,099 | A | 5/1981 | Johnson et al. |
| 4,952,076 | A | 8/1990 | Wiley, III et al. |
| 5,088,840 | A | 2/1992 | Radtke |
| 5,391,125 | A | 2/1995 | Turra et al. |
| 5,433,674 | A * | 7/1995 | Sheridan et al. .............. 475/346 |
| 5,466,198 | A | 11/1995 | McKibbin et al. |
| 5,791,789 | A | 8/1998 | Van Duyn et al. |
| 6,223,616 | B1 * | 5/2001 | Sheridan ....................... 475/159 |
| 6,394,387 | B1 | 5/2002 | Mitrovic |
| 7,021,042 | B2 | 4/2006 | Law |
| 7,153,091 | B2 | 12/2006 | Stephenson et al. |
| 7,591,754 | B2 | 9/2009 | Duong et al. |
| 7,824,305 | B2 | 11/2010 | Duong et al. |
| 7,926,260 | B2 | 4/2011 | Sheridan et al. |
| 8,205,432 | B2 | 6/2012 | Sheridan |

(Continued)

OTHER PUBLICATIONS

T. A. Dickey et al., "The Evolution and Development Status of the ALF 502 Turbofan Engine", Society of Automotive Engineers, Inc.; National Aerospace Engineering & Mfg. Meeting, Oct. 2-5, 1972, 15 pages.

(Continued)

*Primary Examiner* — Derek D Knight
(74) *Attorney, Agent, or Firm* — Kinney & Lange, P.A.

(57) ABSTRACT

A star gear train for use in a gas turbine engine includes a sun gear, a ring gear, a plurality of star gears and a coupling system. The sun gear is rotatable by a shaft. The ring gear is secured to a ring gear shaft. Each of the plurality of star gears is rotatably mounted in a star carrier and meshes with the sun gear and the ring gear. The coupling system comprises a sun gear flexible coupling, a carrier flexible coupling and a deflection limiter. The sun gear flexible coupling connects the sun gear to the shaft. The carrier flexible coupling connects the carrier to a non-rotating mechanical ground. The deflection limiter is connected to the star carrier to limit excessive radial and circumferential displacement of the star gear train.

20 Claims, 5 Drawing Sheets

(56) References Cited

U.S. PATENT DOCUMENTS

| | | | |
|---|---|---|---|
| 8,276,275 B2* | 10/2012 | Sheridan et al. | 29/893.1 |
| 2008/0006018 A1* | 1/2008 | Sheridan et al. | 60/39.1 |
| 2010/0150702 A1* | 6/2010 | Sheridan et al. | 415/170.1 |
| 2010/0154217 A1* | 6/2010 | Sheridan et al. | 29/893.1 |
| 2010/0160105 A1* | 6/2010 | Sheridan et al. | 475/159 |
| 2012/0121378 A1* | 5/2012 | Sheridan et al. | 415/1 |
| 2012/0213628 A1* | 8/2012 | McCune et al. | 415/122.1 |
| 2012/0237334 A1* | 9/2012 | McCune et al. | 415/122.1 |
| 2012/0237335 A1* | 9/2012 | McCune et al. | 415/122.1 |
| 2012/0237336 A1* | 9/2012 | McCune et al. | 415/122.1 |
| 2012/0238401 A1* | 9/2012 | McCune et al. | 475/331 |
| 2012/0243971 A1* | 9/2012 | McCune et al. | 415/122.1 |
| 2012/0272762 A1* | 11/2012 | Sheridan | 74/412 R |
| 2012/0275904 A1* | 11/2012 | McCune et al. | 415/122.1 |
| 2013/0023378 A1* | 1/2013 | McCune et al. | 475/344 |
| 2013/0051984 A1* | 2/2013 | McCune et al. | 415/122.1 |

OTHER PUBLICATIONS

M. Cusick, "Avco Lycoming's ALF 502 High Bypass Fan Engine", Society of Automotive Engineers, Inc.; Business Aircraft Meeting & Exposition, Apr. 7-10, 1981, 13 pages.

K. R. Fledderjon, The TFR731-5: Evolution of a Decade of Business Jet Service; Business Aircraft Meeting & Exposition, Apr. 12-15, 1983; 17 pages.

IHS Jane's, Jane's Aero-Engines, "Ivchenko-Progress D-727" (Ukraine) Feb. 7, 2007, 2 pages.

IHS Jane's, Jane's Aero-Engines, "Aviadvigatel D-110" (Russian Federation) Jun. 1, 2010, 4 pages.

IHS Jane's, Jane's Aero-Engines, "Turbomeca Aubisque" (France) Nov. 2, 2009, 4 pages.

IHS Jane's, Jane's Aero-Engines, "Rolls-Royce M45H" (United Kingdom) Feb. 24, 2010, 4 pages.

IHS Jane's, Jane's Aero-Engines, "Ivchenko-Progress Al-727M" (Ukraine) Nov. 27, 2011, 4 pages.

IHS Jane's, Jane's Aero-Engines, "Ivchenko-Progress D-436" (Ukraine) Feb. 8, 2012, 11 pages.

IHS Jane's, Jane's Aero-Engines, "Honeywell LF507" (United States) Feb. 9, 2012, 4 pages.

IHS Jane's, Jane's Aero-Engines, "Honeywell LF502" (United States) Feb. 9, 2012, 6 pages.

IHS Jane's, Jane's Aero-Engines, "Honewell TFE731" (United States) Jul. 18, 2012, 15 pages.

NASA Conference Publication 2077, "Quiet, Powered-Lift Propulsion", Conference held on Nov. 14-15, 1978, pp. 79-81.

Collections of materials relating to TFE731-LF507 engines.

International Search Report and Written Opinion for European Patent Application No. 10252197.8, filed Dec. 22, 2010.

* cited by examiner

COUPLING SYSTEM FOR A STAR GEAR TRAIN IN A GAS TURBINE ENGINE

CROSS-REFERENCE TO RELATED APPLICATION(S)

This application claims priority as a continuation-in-part under 35 U.S.C. §120 of an earlier filed application entitled "Oil Baffle For Gas Turbine Fan Drive Gear System" by William G. Sheridan and Michael E. McCune, filed on Jul. 5, 2006 and having Ser. No. 11/481,112 (published as US2008/0006018), which is assigned to the same assignee as the present application.

BACKGROUND

The present invention is directed to shaft mounting arrangements in gas turbine engines. In particular, the present invention relates to systems for coupling epicyclic gear trains with shafts in gas turbine fan drive gear systems.

Epicyclic gear trains are typically used in gas turbine engines incorporating fan drive gear systems. The epicyclic gear train reduces the output speed of the gas turbine engine in order to drive a large diameter fan. For high bypass ratios where a greater proportion of engine inlet air is directed to the fan rather than the core engine, issues such as fan blade tip speeds are not problematic. As such, epicyclic gear trains can be configured as a star gear train or as a planetary gear train to match the gear reduction ratio with the appropriate fan bypass ratio. Star gear trains are supported axially between a gas turbine engine input shaft and an output fan shaft, and radially by a ground connection to a stationary engine component. It is desirable to maintain proper alignment of shafts coupled to epicyclic gear trains in order to reduce wear. Particularly, misalignment of the input and output shafts can result in wear of gear teeth in the gear train.

Various aircraft maneuvers induce vibration of gear trains supported by rotating shafts within gas turbine engines. For example, high gravity turns or hard landing operations induce flexure of engine cases, sometimes referred to as backbone bending, that is transmitted to the gear train as a bending moment that shocks the gear teeth. It is advantageous to permit the gear train to be radially displaced a limited amount to absorb flexure of the shafts without damaging the gear teeth. Epicyclic gear trains are often suspended or cantilevered at ends of flexible shafts in an overhung configuration to accommodate radial displacement. Overhung configurations, however, sometimes permit too much flexure during various aircraft maneuvers. There is, therefore, a need for a shaft coupling system for star gear trains suitable for use during all engine operations.

SUMMARY

The present invention is directed to a star gear train for use in a gas turbine engine. The star gear train includes a sun gear, a ring gear, a plurality of star gears and a coupling system. The sun gear is rotatable by a shaft. The ring gear is secured to a ring gear shaft. Each of the plurality of star gears is rotatably mounted in a star carrier and meshes with the sun gear and the ring gear. The coupling system comprises a sun gear flexible coupling, a carrier flexible coupling and a deflection limiter. The sun gear flexible coupling connects the sun gear to the shaft. The carrier flexible coupling connects the carrier to a non-rotating mechanical ground. The deflection limiter is connected to the star carrier to limit excessive radial and circumferential displacement of the star gear train.

DETAILED DESCRIPTION

Figure 1:
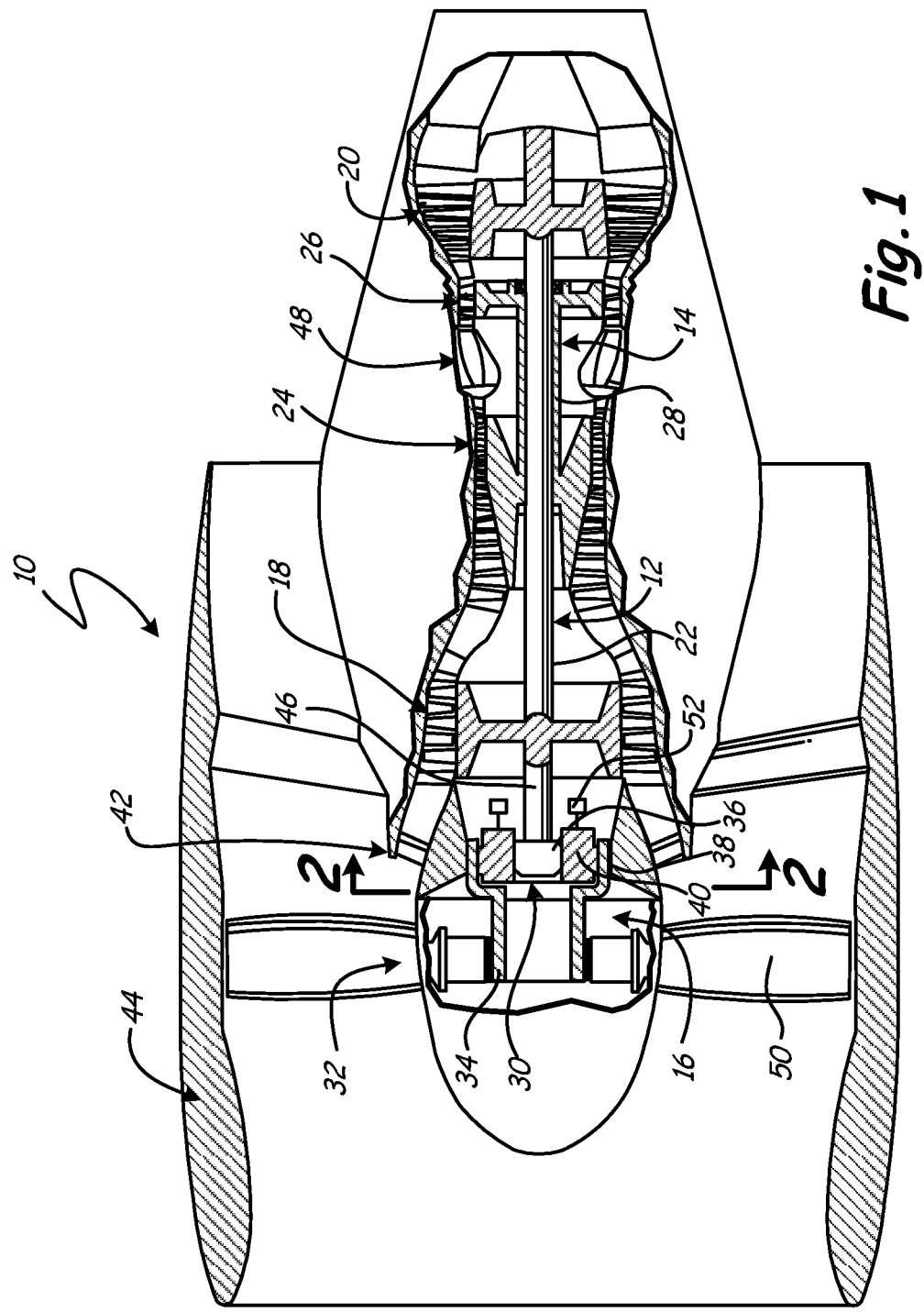
FIG. 1 is a schematic cross-sectional view of a fan drive gear system having a star gear train supported by a mounting system of the present invention.

FIG. 1 shows a schematic cross-section of gas turbine engine 10. Gas turbine engine 10 includes low pressure spool 12, high pressure spool 14 and fan drive gear system 16. Low pressure spool includes low pressure compressor 18 and low pressure turbine 20, which are connected by low pressure shaft 22. High pressure spool 14 includes high pressure compressor 24 and high pressure turbine 26, which are connected by high pressure shaft 28. Fan drive gear system 16 includes epicyclic gear train 30 and fan assembly 32, which are connected by fan shaft 34. Epicyclic gear train 30 includes sun gear 36, ring gear 38 and star gear set 40. Low pressure spool 12 and high pressure spool 14 are covered by engine nacelle 42, and fan assembly 32 and nacelle 42 are covered by nacelle 44. Low pressure spool 12, high pressure spool 14 and fan assembly 32 comprise a two-and-a-half spool gas turbine engine in which epicyclic gear train 30 couples fan assembly 32 to low pressure spool 12 with input shaft 46.

Fan assembly 32 generates bypass air for producing thrust that is directed between engine nacelle 42 and fan nacelle 44, and core air that is directed into engine nacelle 42 for sequential compression with low pressure compressor 18 and high pressure compressor 24. Compressed core air is routed to combustor 48 wherein it is mixed with fuel to sustain a combustion process. High energy gases generated in combustor 48 are used to turn high pressure turbine 26 and low pressure turbine 20. High pressure turbine 26 and low pressure turbine 20 rotate high pressure shaft 28 and low pressure shaft 22 to drive high pressure compressor 24 and low pressure compressor 18, respectively. Low pressure shaft 22 also drives input shaft 46, which connects to epicyclic gear train 30 to drive fan blades 50 of fan assembly 32.

The diameter of fan blades 50, the bypass ratio of fan air to core air, and other factors are used to determine the gear reduction ratio of epicyclic gear train 30. Engine 10 is configured to operate at the low end of the bypass ratio spectrum for high bypass ratio turbofans where low gear reduction ratios are generally used. As such, epicyclic gear train 30 is configured as a star gear train to provide an appropriate gear reduction ratio between input shaft 46 and fan shaft 34. Star gear trains typically provide gear reduction ratios of about 3:1 or less. During operation of engine 10, various forces are applied to fan shaft 34, gear train 30 and input shaft 46. For example, hard turning maneuvers produced with fan blades 50 generate large gravitational forces that impart bending moments in fan shaft 34. Flexure of shaft 34 displaces gear train 30. Large displacements of gear train 30 cause misalignment between gear teeth of sun gear 36, ring gear 38 and star gear set 40. Coupler 52 connects gear train 30 to engine 10 using a mounting system that limits displacement of gear train 30 to acceptable levels.

Figure 2:
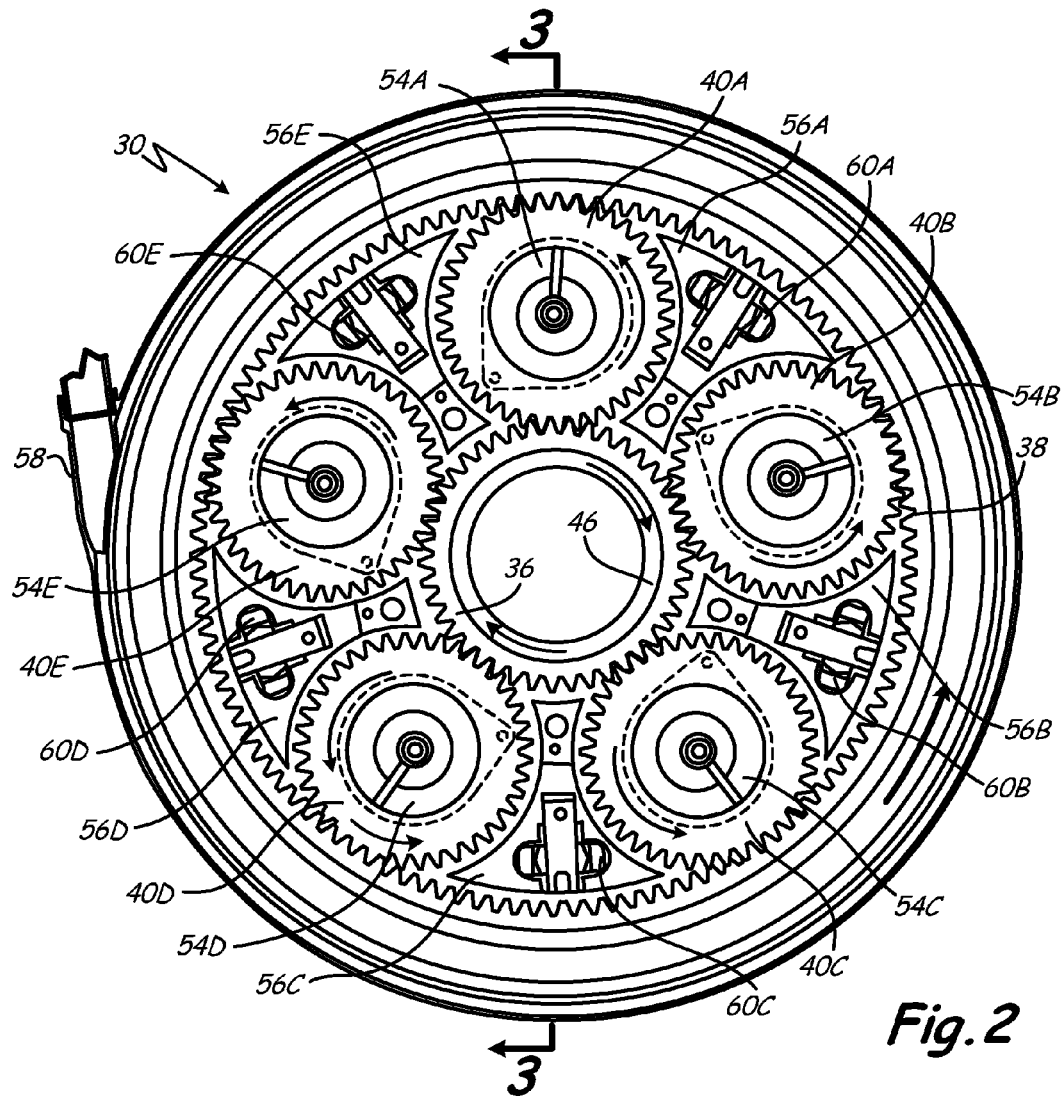
FIG. 2 is a front end view of the star gear train used in the mounting system of FIG. 1.

FIG. 2 is a front end view of star gear train 30 used in fan drive gear system 16 of FIG. 1. Star gear train 30 includes sun gear 36, ring gear 38, star gears 40A-40E of star gear set 40, journal bearings 54A-54E, and lubrication baffles 56A-56E. Sun gear 36 is mounted on input shaft 46, and ring gear 38 is concentrically disposed about sun gear 36. Star gears 40A-40E are positioned between sun gear 36 and ring gear 38. Each of star gears 40A-40E is mounted on a corresponding journal bearing 54A-54E. Baffles 56A-56E are positioned between adjacent journal bearings to form assembly that delivers lubricating fluid to star gears 40A-40B through manifold 58. Baffles 56A-56E are integral parts of, or otherwise joined to a pair of opposing plates that form a gear carrier. Journal bearings 54A-54E are connected to the opposing plates of the gear carrier to support gears 40A-40E. A torque frame that includes fingers 60A-60E connects to the gear carrier through the assemblies of baffles 56A-56E to mechanically ground gear set 40 with respect to engine 10.

For example, input shaft 46 provides rotational power to sun gear 36 of gear train 30 to produce clockwise rotation. Individual star gears of gear set 40 then rotate about journal bearings 54A-54E in a counterclockwise direction. Ring gear 38 rotates about gear set 40 in a counter-clockwise direction. Because of star gears 40A-40E, ring gear 38 and fan shaft 34 (FIG. 1) rotate about the centerline of engine 10 at a slower rate than sun gear 36 and input shaft 46. Fan shaft 34 drives fan assembly 32 to drive fan blades 50, which produce the bulk of the thrust generated by engine 10. Thus, epicyclic gear train 30 comprises a star gear train where gear set 40 remains stationary through grounding of the gear carrier with coupler 52.

Figure 3:
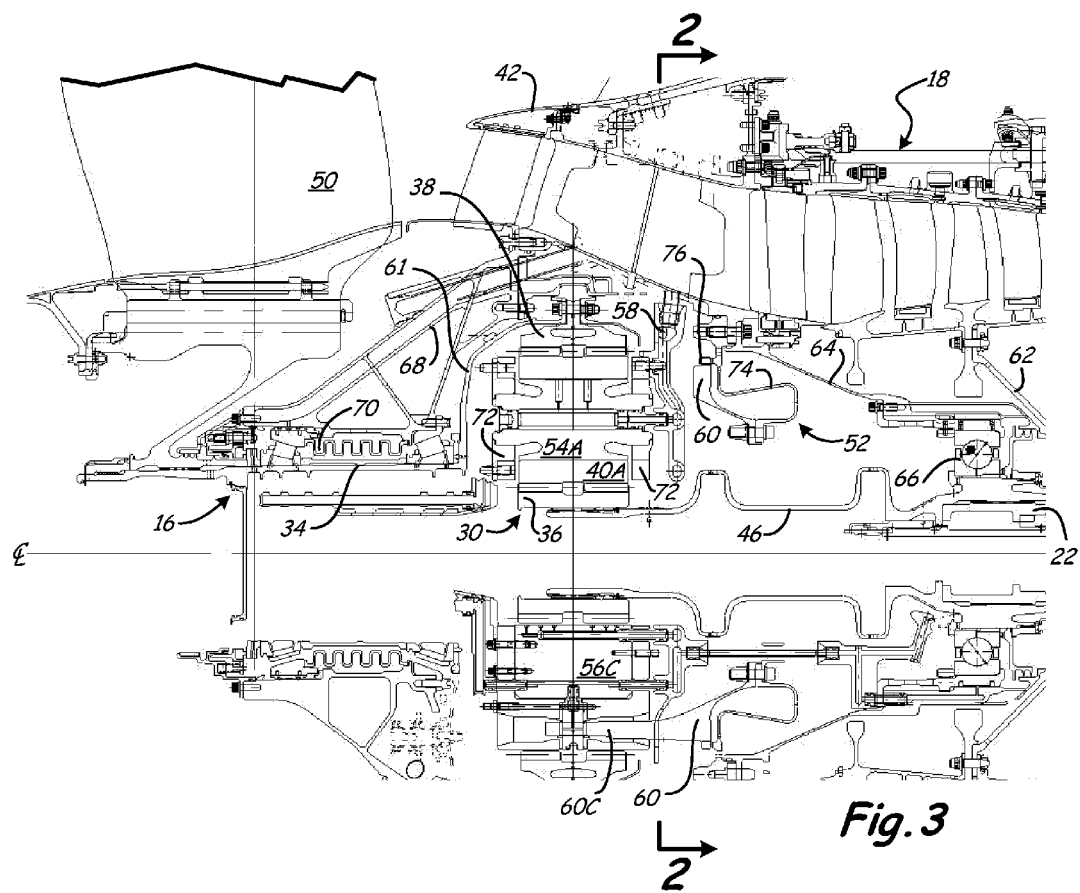
FIG. 3 is a side cross-sectional view of the star gear train of FIG. 2 mounted within a gas turbine engine using a coupling system of the present invention.

FIG. 3 is a side cross-sectional view of star gear train 30 of FIG. 2 mounted within gas turbine engine 10 using coupler 52. Gas turbine engine 10, which is disposed about engine centerline CL, includes fan drive gear system 16, low pressure compressor 18, low pressure shaft 22, star gear train 30, output shaft 34, nacelle 42, input shaft 46, fan blade 50, coupler 52, torque frame 60, ring gear shaft 61, rotor 62, support strut 64, bearing assembly 66, support strut 68 and bearing assembly 70. Planetary gear train 30 includes sun gear 36, ring gear 38, star gear 40A, journal bearing 54A, baffle 56C and gear carrier 72. Coupler 52 includes flexible coupling 74 and deflection limiter 76.

Star gear train 30 is supported within engine 10 by input shaft 46, output shaft 34, and coupler 52. Input shaft 46 and coupler 52 permit star gear train 30 to move within nacelle 42 in order to absorb bending moments applied by output shaft 34. Coupler 52 engages torque frame 60 to prevent gear train 30 from being displaced past a threshold level.

Low pressure shaft 22 extends from gas turbine engine 10 (FIG. 1) to drive input shaft 46. Low pressure compressor 18 is also coupled to low pressure shaft 22 by rotor 62. Low pressure shaft 22 is supported within nacelle 42 by strut 64, which connects to shaft 22 via bearing assembly 66. In the embodiment shown, bearing assembly 66 includes a ball bearing. Input shaft 46 is connected to shaft 22 at a first end, and sun gear 36 at a second end. Gear carrier 72 is anchored to nacelle 42 (or an engine case for fan drive gear system 16 or low pressure compressor 18 within nacelle 42) through torque frame 60. Torque frame 60 provides counter resistance to rotation of gear carrier 72 induced by sun gear 36 through connection to flexible coupling 74. Thus, gear carrier 72 remains stationary within nacelle 42 during operation of engine 10. Gear carrier 72 supports planetary gear set 40 in radial engagement with sun gear 36. Gear carrier 72 comprises a pair of parallel plates between which journal bearing MA extends. Journal bearing MA provides a pin upon which star gear 40A rotates. Ring gear 38 is concentrically disposed around star gear set 40 to be driven by star gears 40A-40E. At a first end, output shaft 34 is attached to ring gear 38 through ring gear shaft 61. At a second end, output shaft 34 connects to fan assembly 32 (FIG. 1) of fan drive gear system 16. Support strut 68 extends from nacelle 42 (or an engine case therein) to support output shaft 34 with bearing assembly 70. In the embodiment shown, bearing assembly 70 includes a pair of tapered roller bearings.

During operation of engine 10, low pressure shaft 22 rotates to drive compressor 18, which provides compressed air for combustion. The ball bearing of bearing assembly 66 accommodates rotation of shaft 22, as well as axial displacement of shaft 22, such as from thermal growth. Support strut 64 rigidly supports bearing assembly 66 such that shaft 22 is generally radially immobilized with respect to nacelle 42 near gear train 30. Input shaft 46 is coupled to shaft 22, such as by a spline, and extends generally axially from shaft 22 to connect to sun gear 36, such as by a spline. Input shaft 46 is not directly supported by bearings so as to permit displacement of gear train 30. Rotation of shaft 46 produces rotation of sun gear 36 about centerline CL. Sun gear 36 causes star gear 40A to rotate about journal bearing MA. Engagement of star gear 40A with ring gear 38 causes ring gear 38 to revolve around centerline CL. Thus, sun gear 36 and ring gear 38 rotate about the engine centerline CL in opposite directions, while star gear 40A rotates in place on journal bearing MA in the opposite direction of sun gear 36. Rotation of ring gear 38 causes output shaft 34 to rotate about centerline CL to drive fan blades 50. The pair of tapered roller bearing of bearing assembly 70 accommodates rotation of shaft 34, but provides resistance to axial loads, such as from thrust forces. Support strut 68 rigidly supports bearing assembly 70 such that shaft 34 is generally radially immobilized with respect to nacelle 42 near gear train 30.

Lubrication is provided to gear train 30 via manifold 58. A lubricant is provided to manifold 58 from a source within engine 10. The lubricant enters manifold 58 and travels into axially extending bores in journal bearings 54A-54E. An independent set of axially extending bores from manifold 58 connects to the assemblies of baffles 56A-56E which distribute lubricant to all of the gear teeth. Baffles 56A-56E assist in distributing the lubricant to all of the gear teeth. The lubricant reduces wear and ensures adequate cooling of the gear teeth. Such lubrication systems are well-known and described in, for example, U.S. Pat. App. 2008/0006018 entitled "Oil Baffle For Gas Turbine Fan Drive Gear System" to William G. Sheridan and Michael E. McCune, which is incorporated herein by this reference.

Operation of engine 10 produces vibration of gear train 30 through shaft 34. For example, changes in airflow across fan blade 50 generates moment stresses in shaft 34, which, if left unchecked, propagate to gear train 30. Engine 10 includes a plurality of mounting means that control vibration and displacement of gear train 30. Shafts 34 and 46 support gear train 30 axially and provide a degree of radial support that is proportional to the flexibility of the shafts, as influenced by bearing assemblies 70 and 66, respectively. Gear train 30 is also supported within engine 10 by coupler 52, which offers two-stage support. Flex coupling 74 provides radial support from strut 64 during all operations of engine 10. Deflection limiter 76 engages torque frame 60 to limit radial and circumferential deflections of gear train 30 during operations of engine 10 that induce high bending moments of shaft 34 or excessive circumferential loads from fan drive gear system 16.

Bearing assembly 70 provides gear train 30 with a first degree of stability. Deflection of output shaft 34 is dampened by bearing assembly 70 to reduce the amount of vibration passed on to gear train 30. Bearing assembly 70 stiffens shaft 34 to inhibit flexure induced by bending moments from blade 50. A second degree of stability is provided by flexible shaft 46, which absorbs movement of gear train 30 imparted by shaft 34. Flexible shaft 46 allows gear train 30 to displace as shaft 34 flexes. Specifically, input shaft 46 comprises a flexible shaft that includes undulations or bends that permit flexure of the shaft. Such shafts are described in greater detail in U.S. Pat. No. 5,433,674 to Sheridan et al., which is assigned to United Technologies Corporation, Hartford, Conn. and is incorporated herein by this reference. As such, shaft 46 permits gear train 30 to move with shaft 34 to maintain proper alignment of gear teeth.

To further dampen displacement, gear train 30 is provided with direct coupling means to a stationary component within engine 10. Torque frame 60 is connected to strut 64 by flexible coupling 74. Flexible coupling 74 comprises a spring-like member that absorbs radial and axial movement of gear train 30 and provides resistance to circumferential rotation of gear train 30. Similar flex couplings are described in U.S. Pat. No. 6,223,616 to Sheridan for star gear trains, which is assigned to United Technologies Corporation, Hartford, Conn., and the aforementioned U.S. Pat. No. 5,433,674 for planetary gear trains, which are incorporated herein by this reference. During most operations of engine 10, bearing assembly 70, flexible coupling 74 and flexible shaft 46 provide the requisite level of vibration damping and stability to gear train 30 to avoid unacceptable binding of gear teeth within gear train 30. However, severe displacement of gear train 30 from shaft 34 is undesirable, as can occur under extreme operating conditions. Thus, coupler 52 is provided with deflection limiter 76, which is described in greater detail with reference to FIG. 4.

Figure 4:
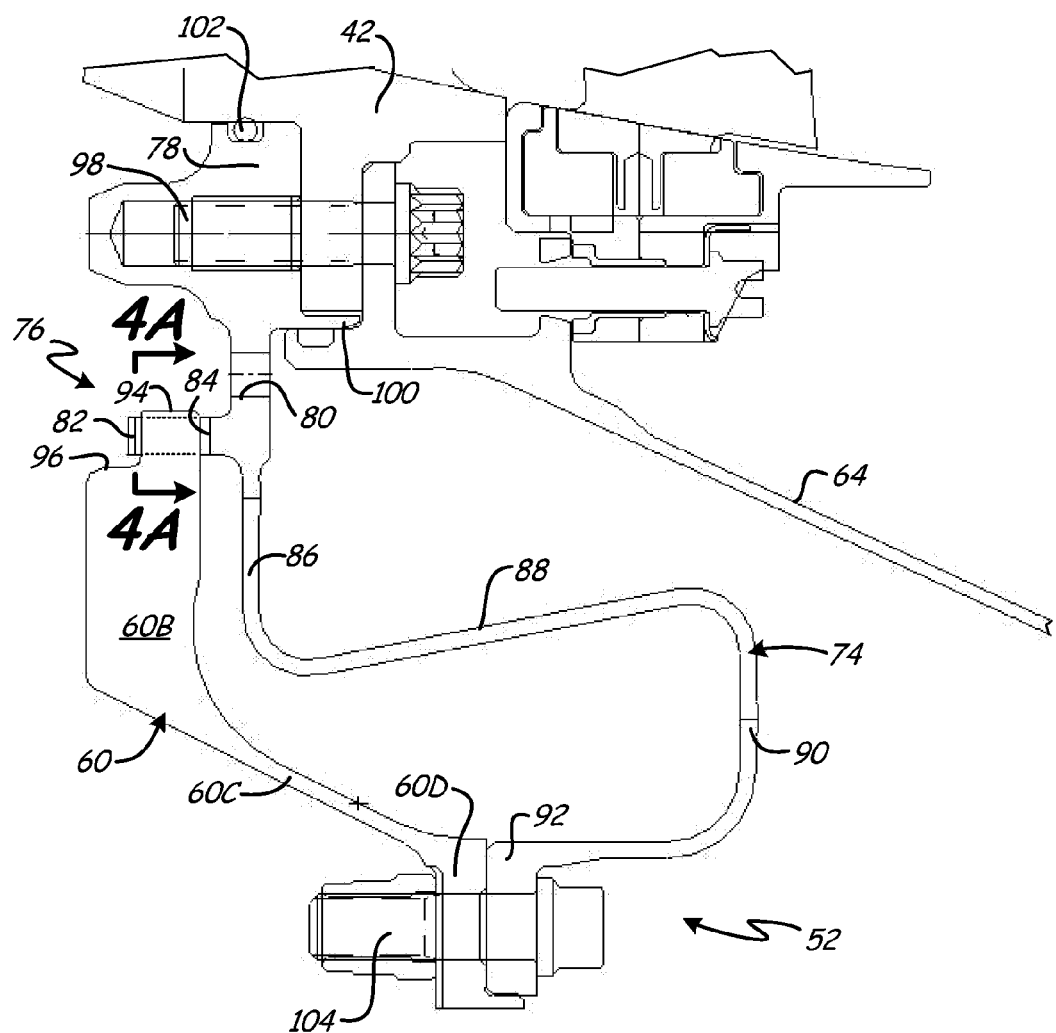
FIG. 4 is a side view of the coupling system of FIG. 3 showing a radial and torsional deflection limiter.

FIG. 4 is a side view of coupler 52 of FIG. 3 having flexible coupling 74 and deflection limiter 76. Flexible coupling 74 is connected between nacelle 42 and torque frame 60. Flexible coupling 74 includes mounting head 78, through-bore 80, limiter flange 82, limiter slot 84, first longitudinal segment 86, lateral segment 88, second longitudinal segment 90 and torque head 92. Torque frame 60 includes annular body 60B, from which fingers 60A-60E (FIGS. 2 and 3) extend, torque disk 60C, head 60D, tab 94 and shoulder 96. Deflection limiter 76 includes flange 82 and limiter slot 84 of flexible coupling 74, and tab 94 and shoulder 96 of torque frame 60. Slot 84 and tab 94 are interconnected in a manner that limits both radial and circumferential displacement of gear train 30 as further described herein.

Mounting head 78 of flexible coupling 74 is connected to strut 64 and nacelle 42 via threaded fastener 98. Mounting head 78 includes angular surfaces for coupling with strut 64 and nacelle 42 to prevent rotation of flexible coupling 74. For example, flange 100 engages a mounting flange on nacelle 42 to inhibit displacement of head 78. Head 78 also includes a notch for receiving O-ring 102 to prevent lubricating oil within gear train 30 from escaping into the air flow path of engine 10. Limiter flange 82 extends from head 78 in a generally axially forward direction so as to be disposed radially outward of torque frame 60. Through-bore 80 is positioned in head 78 to permit lubricating oil to drain into appropriate reservoirs where fluid pumps are located. Thus, mounting head 78 provides a stationary, or mechanically grounded, connection point for receiving torque from gear carrier 72 (FIG. 3) through torque frame 60.

In one embodiment, flexible coupling 74 comprises a formed sheet metal component having three segments that are heat treated for stress relief. First longitudinal segment 86 extends generally radially inward from head 78. Lateral segment 88 extends generally axially from first longitudinal segment 86. Lateral segment 88 extends straight between longitudinal segments 86 and 90 and is connected via two curved portions. Lateral segment 88 thus provides longitudinal flexible coupling 74 two degrees of freedom, while maintaining a degree of axial rigidity. Lateral segment 88 extends radially outwardly, or is flared, from first longitudinal segment 86 to second longitudinal segment 90 for radial compactness. Second longitudinal segment 90 extends generally radially inward from lateral segment 88. Thus, torque head 92 is displaced radially inward and axially aft of mounting head 78. Torque head 92 comprises a flange that extends radially inward from longitudinal segment 90. Torque head 92 connects flexible coupling 74 to torque frame 60.

Head 60D comprises a radially extending flange that mates with torque head 92. Torque head 92 and head 60D are joined by threaded fastener 104. Torque disk 60C extends axially forward and radially outward from head 60D to form a conical body. Torque disk 60C is thus shaped to accommodate flexible coupling 74 within engine 10 in a radial and axially compact fashion. Annular body 60B connects to a radially outer side of torque disk 60B. Fingers 60A-60E extend axially forward from annular body 60B to engage gear carrier 72, as shown in FIG. 3. Annular body 60B also forms shoulder 96 of deflection limiter 76. Shoulder 96 comprises an annular surface at the radially outer limit of torque frame 60 upon which tab 94 is mounted. Tab 94 is one of a plurality of tabs distributed around the circumference of shoulder 96. Tabs 94 comprise three-sided projections that extend radially from shoulder 96. As viewed from an axial direction, tabs 94 comprise quadrangular trunnions or merlons. Sidewalls of tabs 94 are extend radially to engage limiter flange 82.

Limiter flange 82 extends axially from head 78 of flexible coupling 74. Flange 82 includes a plurality of three-sided slots 84 that form quadrangular notches or crenellations, as viewed from a radial direction. Slots 84 have radially extending sidewalls that engage sidewalls of tabs 94 to inhibit circumferential rotation of torque frame 60. The radially innermost, or bottom, surface of flange 82 is arcuate or curved to mate with shoulder 96 of annular body 60B to inhibit radial displacement of torque frame 60. Thus, flange 82 and tabs 94 form a spline, or a loose finger joint, that inhibits movement in two dimensions, as shown more clearly in FIG. 4A.

Figure 4A:
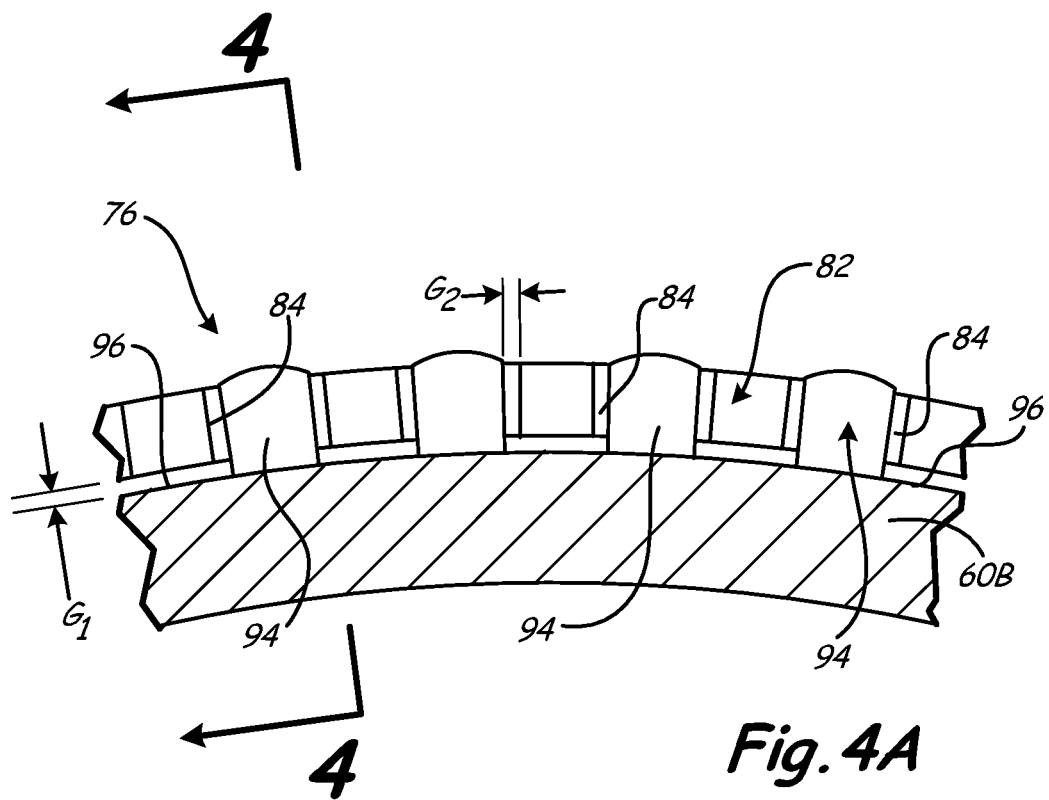
FIG. 4A shows a broken-out front view of the radial and torsional deflection limiter of FIG. 4.

FIG. 4A shows a broken-out front view of deflection limiter 76 of FIG. 4. Deflection limiter 76 includes limiter flange 82 and shoulder 96. Flange 82 extends axially forward from flexible coupling 74 and includes a plurality of slots 84 that are open in the forward direction and include a back wall and two sidewalls. Shoulder 96 comprises an outer annular surface of annular body 60B of torque frame 60. A plurality of tabs 94 extend radially from shoulder 96 to extend between adjacent slots 84.

Flange 82 acts as a hard stop that prevents output shaft 34 from flexing beyond its maximum stress level. When shaft 34 is subject to a bending moment that causes gear train 30 to be displaced past a threshold level, shoulder 96 engages flange 82. The threshold level corresponds to the magnitude of the bending moment in shaft 34 needed to displace gear train 30 the distance between shoulder 96 and flange 82, which is typically set below the maximum bending moment shaft 34 is able to withstand. The gap $G_1$ between flange 82 and shoulder 96 can be set as a design point and adjusted for different mounting configurations. As shown in FIG. 4, displacement of gear train 30 by shaft 34 causes second longitudinal segment 90 to deflect lateral segment 88 as torque disk 60C pushes head 92. Engagement of shoulder 96 with flange 82 allows output shaft 34 to resist bending movements imparted by blades 50. The amount of resistance provided by flexible coupling 74 can be set to vary based on different engine configurations. For example, the stiffness of the curved portions between lateral segment 88 and longitudinal segments 86 and 90 can be varied by changing the thickness of coupling 74 or the amount of curvature. Thus, during normal operating conditions of engine 10, flange 82 does not engage shoulder 96, and flexible coupling 74 allows gear train 30 to be displaced. However, during extreme operating conditions, shoulder 96 engages flange 82 to inhibit further displacement of gear train 30 to avoid excessive wear or damage.

Tab 94 provides a backup mechanical ground to star gear train 30. For example, if flexible coupling 74 were to become damaged at lateral segment 88, or if torque frame 60 were to become damaged at torque disk 60C, tab 94 would engage slot 84 to prevent gear carrier 72 from rotating. Thus, gear train 30 would continue to transmit torque from input shaft 46 to output shaft 34 to enable fan drive gear system 16 (FIG. 1) to continue to produce thrust. Tab 94 can also be configured to engage slot 84 at a point when flexible coupling 74 becomes stressed at a threshold level, beyond which flexible coupling may become damaged. The gap $G_2$ between tab 94 and slot 84 can be set as a design point and adjusted for different mounting configurations.

The coupling system of the present invention provides a compact system for supporting an epicyclic gear train within a fan drive gear system. The coupling system includes a flexible mechanical ground that permits the gear train to be radially displaced to prevent binding of gear teeth. The flexible mechanical ground includes a radial deflection limiter that prevents the gear train from being displaced past a threshold level at which the gear train or a fan shaft driven by the gear train may become damaged. The gear train also includes a circumferential torque limiter that allows torque from the gear train to be resisted by the flexible coupling.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A star gear train having:
    a sun gear rotatable by a shaft;
    a ring gear secured to a ring gear shaft;
    a plurality of star gears rotatably mounted in a star carrier and meshing with the sun gear and the ring gear; and
    a coupling system comprising:
        a carrier flexible coupling connecting to a nonrotating mechanical ground;
        a torque frame connecting the star carrier to the carrier flexible coupling; and
        a deflection limiter comprising a spline that inhibits radial displacement and circumferential rotation of the star carrier, the deflection limiter comprising:
            an annular rim of the torque frame forming an outer shoulder;
            a plurality of tabs radially extending from the shoulder;
            an annular flange extending axially from the carrier flexible coupling; and
            a plurality of slots disposed in the annular flange to engage the plurality of tabs.

2. The star gear train of claim 1 wherein the carrier flexible coupling comprises:
    a mounting head connected to the ground, wherein the annular flange extends from the mounting head;
    a first longitudinal segment extending generally radially inward from the mounting head;
    a straight lateral segment extending generally axially from the first longitudinal segment;
    a second longitudinal segment extending generally radially inward from the lateral segment; and
    a torque head connected to the second longitudinal segment and coupled to the torque frame.

3. The star gear train of claim 2 wherein the coupling system further comprises:
    a sun gear flexible coupling connecting the sun gear to the shaft.

4. A star gear train comprising:
    a sun gear rotatable by a shaft;
    a ring gear secured to a ring gear shaft;
    a plurality of star gears rotatably mounted in a star carrier and meshing with the sun gear and the ring gear;
    a torque frame extending from the star carrier;
    a carrier flexible coupling connecting the torque frame to a non-rotating mechanical ground; and
    an annular flange extending from the carrier flexible coupling to engage and limit displacement of the torque frame.

5. The star gear train of claim 4 wherein the annular flange engages the torque frame to inhibit radial displacement and circumferential rotation between the torque frame and the carrier flexible coupling.

6. The star gear train of claim 4 wherein the annular flange is positioned radially between the torque frame and the non-rotating mechanical ground.

7. The star gear train of claim 4 wherein the carrier flexible coupling comprises:
    a stationary portion connected to the non-rotating mechanical ground and from which the annular flange extends; and
    a radially deflectable portion extending from the stationary portion to connect to the torque frame.

8. The star gear train of claim 4 wherein the torque frame comprises:
    a plurality of fingers extending into the torque frame;
    an annular rim from which the fingers extend;
    a torque disk extending from the annular rim; and
    a torque head connected to the torque disk.

9. The star gear train of claim 8 wherein the carrier flexible coupling comprises:
    a carrier torque head coupled to the torque head of the torque frame;
    a mounting head connected to the non-rotating mechanical ground, wherein the annular flange extends from the mounting head; and
    a plurality of segments extending between the torque head and the mounting head.

10. The star gear train of claim 9 wherein the torque frame further comprises:
    a shoulder on the annular rim; and
    tabs extending from the shoulder to engage slots in the annular flange.

11. The star gear train of claim 9 wherein the plurality of segments are Z-shaped so as to provide radial resiliency and to extend across the annular rim and the torque disk.

12. The star gear train of claim 11 wherein:
   the fingers are inserted into an axial aft side of the star carrier;
   the torque disk extends axially afterward from the annular rim; and
   the plurality of segments extend axially forward from the carrier torque head to the mounting head, such that the annular flange engages the annular rim.

13. A mounting system for an epicyclic gear system, the mounting system comprising:
   a non-rotating mechanical ground;
   a torque frame comprising:
      an annular rim having a first face and a second face;
      a plurality of fingers extending from the first face of the annular rim, the plurality of fingers configured to engage the epicyclic gear system;
      a torque disk extending radially inward and axially afterward from the second face of the annular rim; and
      a torque head connected to the torque disk;
   a flexible coupling comprising:
      a carrier torque head coupled to the torque head of the torque frame;
      a mounting head connected to the non-rotating mechanical ground; and
      a plurality of segments extending between the torque head and the mounting head; and
   a deflection limiter engaging the torque frame and the flexible coupling to limit relative radial and circumferential movement between the deflection limiter and the torque frame.

14. The mounting system of claim 13 wherein the deflection limiter comprises:
   an annular flange extending from the mounting head to engage the torque frame.

15. The mounting system of claim 14 wherein the deflection limiter comprises a spline.

16. The mounting system of claim 14 wherein the annular flange is positioned radially between the annular rim and the non-rotating mechanical ground.

17. The mounting system of claim 14 wherein the plurality of segments extend axially forward from the carrier torque head to the mounting head to extend across the torque disk.

18. The mounting system of claim 14 wherein the flexible coupling comprises:
   a first longitudinal segment extending generally radially inward from the mounting head;
   a lateral segment extending generally axially from the first longitudinal segment; and
   a second longitudinal segment extending generally radially inward from the lateral segment to the second mounting flange;
   wherein the lateral segment extends straight between the first longitudinal segment and the second longitudinal segment; and
   wherein the lateral segment is flared radially outward from the first longitudinal segment to the second longitudinal segment.

19. The mounting system of claim 14 and further comprising:
   a radially opened annular notch disposed in the mounting head of the flexible coupling; and
   an O-ring disposed in the notch.

20. The mounting system of claim 14 and further comprising:
   a through-bore disposed in the mounting head to permit lubrication fluid to pass through the flexible coupling.

* * * * *

UNITED STATES PATENT AND TRADEMARK OFFICE
CERTIFICATE OF CORRECTION

Page 1 of 1

PATENT NO.        : 8,585,538 B2
APPLICATION NO.   : 12/644848
DATED             : November 19, 2013
INVENTOR(S)       : William G. Sheridan et al.

It is certified that error appears in the above-identified patent and that said Letters Patent is hereby corrected as shown below:

Title Page item (75), Inventors
  Delete "McClune"
  Insert --McCune--

In the Specification:
Col. 4, Line 3
  Delete "MA"
  Insert --54A--

Col. 4, Line 3
  Delete "MA"
  Insert --54A--

Col. 4, Line 27
  Delete "MA"
  Insert --54A--

Col. 4, Line 31
  Delete "MA"
  Insert --54A--

In the Claims:
Col. 9, Line 7
  Delete "afterward"
  Insert --aftward--

Col. 9, Line 20
  Delete "afterward"
  Insert --aftward--

Signed and Sealed this
Eleventh Day of February, 2014

Michelle K. Lee
*Deputy Director of the United States Patent and Trademark Office*